United States Patent Office 3,154,588
Patented Oct. 27, 1964

3,154,588
RECOVERY OF ACETALDEHYDE
Thomas C. Singleton, Texas City, and Robert G. Roth, Dickinson, Tex., assignors to Monsanto Company, a corporation of Delaware
No Drawing. Filed Aug. 19, 1960, Ser. No. 50,587
2 Claims. (Cl. 260—601)

The present invention relates to a method for recovery of acetaldehyde. More particularly, it relates to a method for recovering acetaldehyde from aqueous lactonitrile-containing streams obtained in the purification of acrylonitrile produced by the reaction of acetylene and HCN.

Crude acrylonitrile as obtained by the reaction of acetylene and hydrogen cyanide in the presence of a copper chloride catalyst normally contains lactonitrile as a by-product in a ratio of about 1:10 to acrylonitrile. In the typical prior art process, recovery of the acrylonitrile involves the absorption of the acrylonitrile and soluble impurities (which include lactonitrile) from the reactor effluent gas directly into water to form a dilute solution (1–2%) of acrylonitrile. Thereafter, this impure stream is contacted with a gas, such as a stream of steam, nitrogen or gaseous acetylene to strip out the least soluble impurities from the water solution. The solution is then steam-stripped and distilled in one or more fractionating columns. Product acrylonitrile is recovered overhead from a product or finishing column while the high boiling impurities such as lactonitrile and cyanobutadiene are passed out the bottom of this column. Since the bottoms stream contains a considerable amount of acrylonitrile, it is generally processed further by vacuum distillation to recover this acrylonitrile with the residue stream containing the lactronitrile being disposed of as waste. Another scheme for recovering acrylonitrile from the bottoms stream of the product column involves water extraction of the acrylonitrile and lactonitrile with simultaneous recovery of cyanobutadiene as the organic phase from said extraction and subsequent distillation of the aqueous phase to yield acrylonitrile and an aqueous solution of lactonitrile.

Thus, the purification of acrylonitrile produced from acetylene and HCN provides a potential source of lactonitrile. Various methods have been suggested for recovering this lactonitrile content. These, however, have not been entirely satisfactory for a variety of reasons. Primarily it has been difficult to obtain a product of adequate purity free from color and odor. Also proposed procedures have been of such a complex nature as to make a commercial operation difficult particularly in view of the fact that good yields are hard to attain. There has continued to remain, therefore, a need for a method for recovering the economic values represented in lactonitrile-containing waste streams.

It is a primary object of this invention to fulfill this need. It is a further object of the invention to provide a relatively simple method for treating lactonitrile-containing streams to recover acetaldehyde therefrom. Other objects and advantages of the invention will become apparent from the following description thereof.

According to the invention, an aqueous lactonitrile-containing stream is treated with a solution of an alkali metal hydroxide and acetaldehyde is thereafter distilled from the mixture leaving a residual liquor consisting essentially of an alkali metal cyanide which is useful per se or which can be readily converted to HCN. The treatment can be effected simply by adding the aqueous lactonitrile-containing solution to a boiling alkali metal hydroxide solution in a still pot attached to a distilling column. In the preferred embodiment of the invention, however, a lactonitrile-containing stream and an alkali metal hydroxide stream are continuously introduced into a packed distillation column maintained at a temperature within the range from about 30° C. to about 100° C., and the acetaldehyde released is continuously removed overhead at a rate substantially equal to that at which it is formed while a continuous overflow from the still is provided to collect the by-product cyanide solution.

The invention is illustrated in the following examples which, however, are not to be construed as limiting it in any manner whatsoever.

EXAMPLE I

Approximately 50 ml. of water was charged to a 500-ml. flask having attached thereto a distilling column about 2 ft. long and 1 in. in diameter which are packed with glass helices. Sufficient heat supplied by means of an electrical heating mantle was applied to the flask to boil the water. When water was distilling overhead from the column, an aqueous 0.5 molar solution of lactonitrile and a 0.542 molar solution of sodium hydroxide were introduced simultaneously into the top of the column via calibrated rotameters. Overhead vapors were continuously withdrawn from the column and passed through a condenser with the condensate being collected in a receiver cooled by circulating ice water. Two different flow rates of lactonitrile and caustic were employed over given periods of time and separate overhead fractions were collected at the respective rates. After operation at one flow rate, the feeds of the caustic and nitrile solutions were discontinued while the distillation was continued for a period of 10 min. to attempt to remove all acetaldehyde from the column before again feeding the nitrile and caustic at the other feed rate.

Each of the distillate fractions was analyzed for aldehyde content by the hydroxylamine method. Ultraviolet spectra were also obtained on the distillate fractions in order to determine whether any crotonaldehyde was present and corrections were made where required to the hydroxylamine values for any crotonaldehyde content of the fraction, the acetaldehyde value being expressed as the difference between the two. Data obtained at the different flow rates and yields calculated from these data are presented in Table I below.

Table I

| Fraction | Flow Rate/Min. | | Time of Add'n (Min.) | Acetaldehyde Recovered (Mol) | Acetaldehyde Yield (Percent) |
|---|---|---|---|---|---|
| | NaOH (Mol) | Lactonitrile (Mol) | | | |
| 1 | 0.001 | 0.001 | 15 | 0.00950 | 63 |
| 2 | 0.002 | 0.002 | 10 | 0.0134 | 67 |

EXAMPLE II

In this experiment, the apparatus employed consisted of a 100-ml. flask attached to a two-section distilling column and provided with an overflow drain. The upper section was a 10-tray Oldershaw column while the bottom section was a 25-tray adjustable "Perfo-drip" column manufactured by United Glass Blowing Laboratories having trays of Type 316 stainless steel with $\frac{1}{16}$-in. holes. A solution of sodium hydroxide (1.730 N) and an aqueous waste stream from an acrylonitrile purification process containing 2.98% acrylonitrile and 3.58% lactonitrile were preheated to the column overhead temperature (refluxing water) and introduced simultaneously into the column at approximately the point of junction of the two sections thereof. The feed rate and boiling rate in the pot were adjusted so that the trays in the lower section of the column were slightly loaded. The overhead vapors were continuously removed, passed through a condenser and collected in a cooled receiver. The reaction was carried out over a period of 90 min. with a column pressure of about 600 mm. absolute, an overhead temperature from 87° C. to 88° C. and a constant pot temperature of 95.5° C. A total volume of 1640 ml. of the waste stream and 640 ml. of caustic were fed at approximate rates of 18 ml. and 6 ml. per min. respectively. From analyses of the overhead and bottoms fractions collected for aldehyde content as in Example I, it was determined that 56% of the lactonitrile fed was recovered as acetaldehyde while acrylonitrile recovery was 99.5%. The relatively low yield of acetaldehyde in this instance is believed to be attributable to the inefficient operation of the column brought about by flooding and to the type of column employed.

EXAMPLE III

An apparatus similar to that in Example I was employed, i.e., a distilling column packed with glass helices, except that a continuous overflow drain was provided from the still pot for collection of the bottoms in a separate receiver. Feed streams of aqueous lactonitrile (0.5 M) and sodium hydroxide (0.542 M) were preheated to a temperature of about 85° C. and continuously introduced into the mid-section of the column. The overhead vapors were continuously withdrawn and condensed while the liquid bottoms fractions was also continuously collected by overflow into the receiver provided. Partial reflux was maintained by adding water preheated to about 85° C. at the top of the column. Column pressure was maintained at about 600 mm. Hg, absolute. Two different flow rates were used and separate overhead fractions were collected at these rates. The distillate fractions were analyzed as in Example I. Data obtained and yields based on these data are presented below.

Table II

| Fraction | Flow Rate/Min. | | Time of Add'n (Min.) | Acetaldehyde Recovered (Mol) | Acetaldehyde Yield (Percent) |
|---|---|---|---|---|---|
| | NaOH (Mol) | Lactonitrile (Mol) | | | |
| 1 | 0.001 | 0.001 | 25 | 0.0172 | 68.8 |
| 2 | 0.002 | 0.002 | 20 | 0.0337 | 84.2 |

Although the invention has been illustrated by specific examples in which sodium hydroxide was employed, it is apparent that any alkali metal hydroxide such as potassium hydroxide, lithium hydroxide and the like can be substituted for sodium hydroxide. Also, the hydroxide treating agent can be used in solutions of any concentration as long as the amount of the hydroxide on a molar basis is equivalent to the molar amount of lactonitrile in the stream being treated. For all practical purposes, the 50% caustic commercially available can be used. While equimolecular proportions of hydroxide and nitrile are preferred, a small excess of the hydroxide can be tolerated. However, any large excesses are to be avoided since they lead to aldol formation and significantly lower the yield of acetaldehyde which can be attained. Also, when treating streams containing acrylonitrile as well as lactonitrile, an excess of the alkali metal hydroxide will adversely affect the yield of acrylonitrile which can be recovered simultaneously with the acetaldehyde because of the reactivity of acrylonitrile in the presence of a base.

The temperature range which is operable may be varied depending upon the pressure employed but the temperature of treating must be maintained well above the boiling point of acetaldehyde so that the acetaldehyde can be substantially completely removed as rapidly as it is formed and not remain in the alkaline medium to react further. Accordingly, the temperature must be above about 30° C. and can be as high as 100° C. Preferred overhead column temperatures will depend upon the efficiency of the column used and may be varied correspondingly as the pressure since the process can be operated either under vacuum or at superatmospheric pressures if desired as well as at atmospheric pressure.

The aqueous cyanide solution produced simultaneously with the alkali is readily recovered as the residual liquor in a batch operation or as the bottoms stream from the continuous distillation. Where the present process is employed to purify waste streams from an acrylonitrile process, this product can be readily converted to HCN for recycle to the reactor to react with acetylene to produce more acrylonitrile.

The lactonitrile-containing streams derived from the acrylonitrile process usually contain from 2–5% of the nitrile in water. However, the present process is not restricted to wash water or waste streams from an acrylonitrile process but is applicable to aqueous lactonitrile solutions from any source containing anywhere from about 1 to about 100% lactonitrile. Likewise, the method of the invention is applicable to the recovery of other carbonyl compounds from aqueous cyanohydrin-containing solutions, for example, the recovery of acetone from acetone-cyanohydrin-containing solutions, crotonaldehyde from crotonaldehyde-cyanohydrin-containing solutions, and methyl vinyl ketone from solutions containing methyl vinyl ketone cyanohydrin, and the like.

What is claimed is:
1. The process for recovering acetaldehyde from an aqueous lactonitrile-containing solution which comprises continuously introducing said lactonitrile-containing solution and an aqueous solution of an alkali metal hydroxide having a molar concentration at least equivalent to the molar concentration of lactonitrile in said lactonitrile-containing solution into a packed distilling column maintained at a temperature within the range from about 30° C. to about 100° C. continuously removing acetaldehyde overhead from said column substantially as rapidly as it is formed, and continuously removing from the still of said column an aqueous solution of an alkali metal cyanide.

2. The process of claim 1 wherein the alkali metal hydroxide employed is sodium hydroxide.

References Cited in the file of this patent

UNITED STATES PATENTS 2,868,828    Gill et al. _____ Jan. 13, 1959

OTHER REFERENCES

Williams: Chemistry of Cyanogen Compounds (1915), pages 78 and 81.